March 10, 1931. W. STUEBING, JR 1,796,128
PLATFORM
Filed Feb. 27, 1926
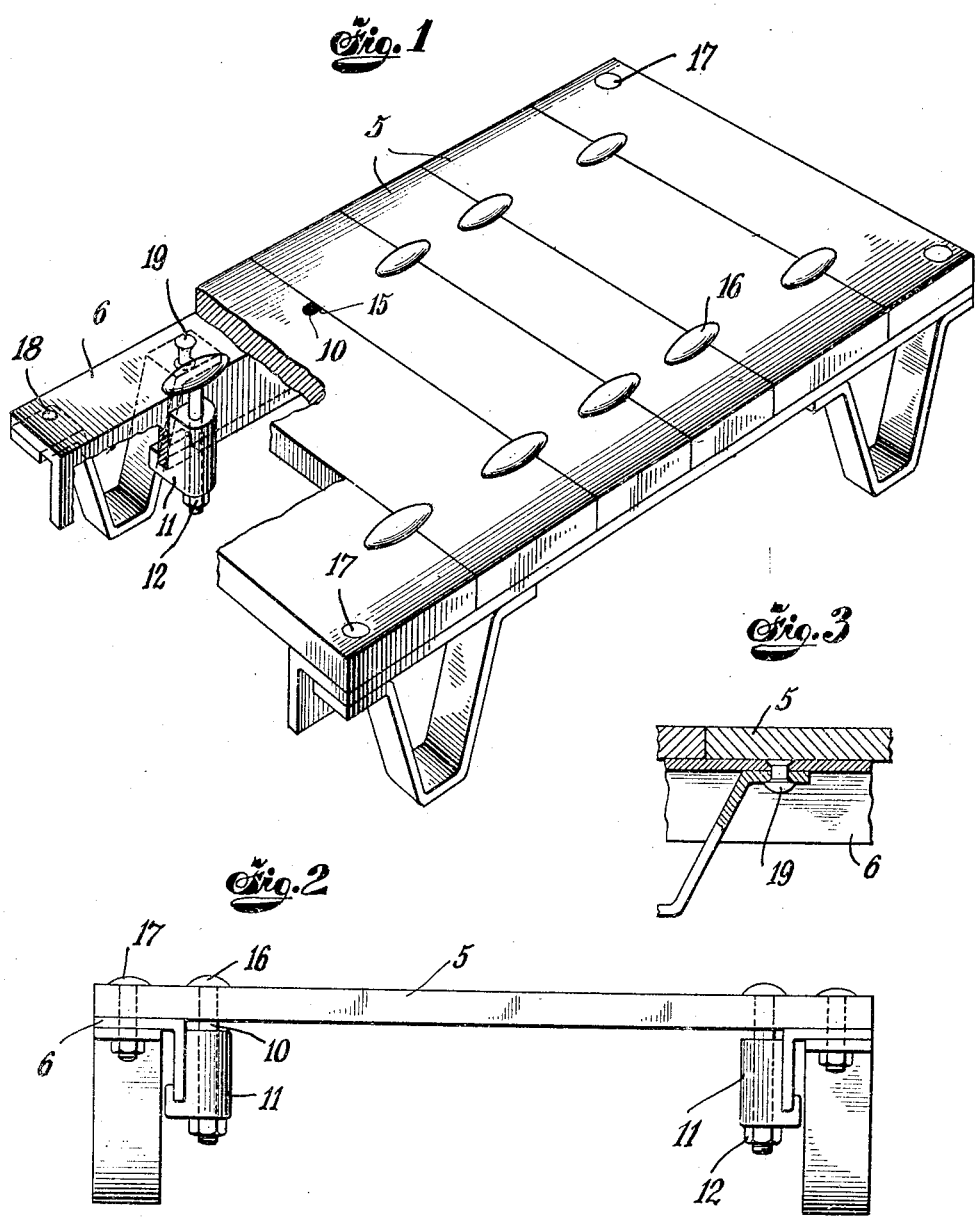

Patented Mar. 10, 1931

1,796,128

UNITED STATES PATENT OFFICE

WILLIAM STUEBING, JR., OF CINCINNATI, OHIO, ASSIGNOR TO THE YALE & TOWNE MANUFACTURING COMPANY, OF STAMFORD, CONNECTICUT, A CORPORATION OF CONNECTICUT

PLATFORM

Application filed February 27, 1926. Serial No. 91,260.

The present invention relates to portable skids or platforms of the type used in manufacturing plants for supporting loads to be transported on lifting trucks and has for an object to provide an improved skid which can be economically and expeditiously manufactured.

These skids must be of strong construction to satisfy the requirements of use and yet they must be of economical construction because of the large number used in each manufacturing plant.

Platforms of the type in which the boards are bolted to underneath metal tie members are usually of such design that in order to be economically fabricated the tie members must be punched or drilled prior to the assembly of the skids. This practically requires the use of lumber cut to exact predetermined standard width. Such lumber is considerably more expensive because of the labor required and the waste in cutting. The present invention provides a skid of such construction that lumber of random widths can be used, each board being effectively secured to the tie members regardless of its width.

Referring to the accompanying drawing forming a part hereof:

Figure 1 is a perspective view of a selected embodiment of the invention, and

Fig. 2 is an end view of the same.

Fig. 3 is a detail sectional view showing the connection of the legs to the platform.

The skid shown for the purpose of illustrating the invention comprises transversely extending parallel floor members such as boards 5 which are secured to suitable supporting tie members or side rails 6. The securing means shown is such that the boards can be connected to the side rails at any desired point. Accordingly in assembling the skid it is possible to place boards of random widths in position and secure each board without drilling holes in the side rails.

The securing device shown is so constructed that it can be hooked over one edge of the side rail at any desired point and then tightened to secure the board firmly in position. As shown the side rails consist of angle bars and when of this form the board securing means preferably engages the vertical flanges in order that the force applied to the boards may be transmitted to the strongests parts of the bars. As shown the securing means consists of a bolt 10, a hook member 11 which engages the vertical flange of the angle bar and a nut 12.

Bolt receiving holes may be provided at any suitable position in the boards. It has been found convenient to notch one edge of each board as indicated at 15 and to use bolts having heads 16 large enough to engage a substantial portion of each of the two adjacent boards. It is more economical in manufacture to form one deep notch in one edge only of each board than to form shallower notches in each of the two meeting edges of adjacent boards.

The end boards are secured to the side rails at the four corners of the skid by bolts 17 extending through holes 18 punched in the horizontal flanges of the side rails.

Suitable legs are secured to the angle bars. As shown, the legs are formed of bar iron bent to suitable shape and secured to the angle bars as by means of spot welding or by the bolts 17 each extending through a leg, an angle bar and a board and by bolts or rivets 19 passing through the inner portion of each leg and the horizontal flange of the angle bar.

The foregoing description of a particular embodiment is illustrative merely and is not intended as defining the limits of the invention.

Having described my invention what I claim as new and desire to secure by Letters Patent is:

A portable skid, for use with a lifting truck, comprising transversely extending floor members, longitudinally extending angle bars, and means for securing the floor members to the angle bars comprising hooks located between said floor members and having a head engaging at least two of said members and engageable over the lower edges of said angle bars.

In testimony whereof, I have signed my name to this specification this 23rd day of February, 1926.

WILLIAM STUEBING, Jr.